United States Patent
Mittleman et al.

(10) Patent No.: US 9,300,773 B2
(45) Date of Patent: *Mar. 29, 2016

(54) PORTABLE ELECTRONIC DEVICE WITH MOISTURE INFILTRATION INDICATION SYSTEM

(75) Inventors: Adam D. Mittleman, San Francisco, CA (US); Erik L. Wang, Redwood City, CA (US); Jason Sloey, San Jose, CA (US)

(73) Assignee: Apple Inc., Cupertino, CA (US)

(*) Notice: Subject to any disclaimer, the term of this patent is extended or adjusted under 35 U.S.C. 154(b) by 1428 days.

This patent is subject to a terminal disclaimer.

(21) Appl. No.: 12/113,902

(22) Filed: May 1, 2008

(65) Prior Publication Data
US 2009/0273480 A1  Nov. 5, 2009

(51) Int. Cl.
G08B 21/00 (2006.01)
H04M 1/02 (2006.01)
H04M 1/18 (2006.01)
H04M 1/725 (2006.01)

(52) U.S. Cl.
CPC ............ H04M 1/0274 (2013.01); H04M 1/18 (2013.01); H04M 1/72522 (2013.01)

(58) Field of Classification Search
CPC ....... G01N 31/22; G01N 31/222; G01D 3/08; G08B 21/20; G09F 3/02
USPC ............... 340/602, 604; 73/73–77; 200/308, 200/310–317; 379/451; 455/575.1; 439/490–491

See application file for complete search history.

(56) References Cited

U.S. PATENT DOCUMENTS 4,058,632 A   11/1977  Evans
4,738,674 A *  4/1988  Todd et al. .................... 604/361

(Continued)

FOREIGN PATENT DOCUMENTS

EP   1001264   5/2000
JP   06248207  9/1994

(Continued)

OTHER PUBLICATIONS

"3M Water Contact Indicator Tapes", Electronic Manuals, Mar. 2005.

(Continued)

*Primary Examiner* — Firmin Backer
*Assistant Examiner* — Nay Tun
(74) *Attorney, Agent, or Firm* — Treyz Law Group, P.C.; G. Victor Treyz; Joseph F. Guihan

(57) ABSTRACT

A portable electronic device may have a dock connector moisture infiltration indication structure for indicating whether moisture has infiltrated the device. The structure may be located within a dock connector port. The dock connector may have a viewing hole that enables viewing of the moisture indicator. The moisture indicator may have four layers: upper and lower moisture barriers, a wicking layer and a dyeing layer. After becoming wet, the moisture indicator may change from one color to another color. A menu button in the device may have a transparent and opaque member with a viewing aperture. A moisture indicator may be formed on the button and may be viewed through the viewing aperture.

19 Claims, 18 Drawing Sheets

(56) References Cited

U.S. PATENT DOCUMENTS

| | | | |
|---|---|---|---|
| 6,078,792 | A | 6/2000 | Phillips |
| 6,408,784 | B1 * | 6/2002 | Ross .................... 116/288 |
| 6,628,785 | B1 | 9/2003 | Kitamura et al. |
| 6,765,812 | B2 * | 7/2004 | Anderson ................ 365/51 |
| 6,831,568 | B1 * | 12/2004 | Cortopassi et al. ...... 340/815.4 |
| 7,050,837 | B2 * | 5/2006 | Menz et al. ............. 455/572 |
| 7,105,225 | B2 | 9/2006 | Birkholz et al. |
| 7,161,491 | B2 * | 1/2007 | Garcia et al. ............ 340/604 |
| 2005/0118415 | A1 | 6/2005 | LaBrosse et al. |
| 2006/0263597 | A1 | 11/2006 | Birkholz et al. |
| 2007/0130592 | A1 * | 6/2007 | Haeusel .................. 725/81 |
| 2008/0134768 | A1 | 6/2008 | Sanford |

FOREIGN PATENT DOCUMENTS

| | | |
|---|---|---|
| WO | 98/23920 | 6/1998 |
| WO | 03/015060 | 2/2003 |
| WO | WO 03015060 A2 * | 2/2003 |
| WO | 03/031531 | 4/2003 |

OTHER PUBLICATIONS

Sanford et al., U.S. Appl. No. 12/688,817, filed Jan. 15, 2010.
Erik L. Wang, U.S. Appl. No. 12/472,192, filed May 26, 2009.

* cited by examiner

PORTABLE ELECTRONIC DEVICE WITH MOISTURE INFILTRATION INDICATION SYSTEM

BACKGROUND

This invention relates generally to electronic devices, and more particularly, to moisture infiltration indicating systems for portable electronic devices such as handheld electronic devices.

Handheld electronic devices and other portable electronic devices are becoming increasingly popular. Examples of handheld devices include handheld computers, cellular telephones, media players, and hybrid devices that include the functionality of multiple devices of this type. Popular portable electronic devices that are somewhat larger than traditional handheld electronic devices include laptop computers and tablet computers.

Portable electronic devices such as handheld electronic devices may contain complex electronic circuitry in a compact area. Electronic components such as memory, processors, and other circuits are highly sensitive to moisture. Too much moisture can create unintended low resistance connections between nodes that are meant to be at different voltages making the circuits perform unpredictably or fail. Because portable electronic devices may not always be operated in a controlled environment, they may be more prone to moisture exposure than stationary electronic devices.

If a portable electronic device becomes inoperable, it can be difficult to determine if the device has been damaged by moisture or is inoperable for another reason. For example, a device may have been exposed to moisture without the knowledge of the owner of the device. It may therefore take time for the repair personnel to troubleshoot the device to determine whether the device has been infiltrated by sufficient moisture to damage the device. It is important to evaluate the moisture infiltration status of devices quickly and easily for many reasons, including troubleshooting, validating warranty claims, and failure analysis.

It would therefore be desirable to be able to provide electronic devices such as portable electronic devices with an improved moisture infiltration indication system which can easily and quickly indicate moisture infiltration.

SUMMARY

A portable electronic device such as a handheld electronic device is provided. The portable electronic device has a dock moisture infiltration indication system for indicating the moisture infiltration status of the device. The moisture infiltration indication system may be located within a dock connector port of the device. A dock connector may have a dock connector frame with a viewing hole structure that enables viewing of a moisture indication structure beneath the viewing hole. The moisture indication structure changes its appearance upon becoming moist and may have four layers: upper and lower moisture barrier layers, a wicking layer and a dyeing layer. When wet, the wicking layer may absorb wet dye from the dyeing layer thereby changing its appearance from one color (e.g., white) to another color (e.g., red). The upper moisture barrier layer may provide a moisture seal from the dock connector cavity while the lower moisture barrier layer may impede moisture from within the device. The moisture barrier layers therefore help prevent the moisture indication structure from becoming excessively sensitive to small amounts of moisture. The moisture barrier layers may be designed to allow more or less moisture to pass—depending upon the needs of the device.

With one suitable arrangement, the moisture infiltration indication system may be implemented as part of a button, such as a menu button. A moisture indication structure may be located beneath the transparent cover. A viewing aperture may allow the moisture indication structure to be viewed through the transparent cover. The viewing aperture may be provided in the form of a logo or other pattern.

Further features of the invention, its nature and various advantages will be more apparent from the accompanying drawings and the following detailed description of the preferred embodiments.

DETAILED DESCRIPTION

The present invention relates to moisture infiltration indication structures for electronic devices.

The electronic devices may be portable electronic devices such as laptop computers or small portable computers of the type that are sometimes referred to as ultraportables. Portable electronic devices may also be somewhat smaller devices. Examples of smaller portable electronic devices include wrist-watch devices, pendant devices, headphone and earpiece devices, and other wearable and miniature devices. With one suitable arrangement, the portable electronic devices may be wireless electronic devices.

The wireless electronic devices may be, for example, handheld wireless devices such as cellular telephones, media players with wireless communications capabilities, handheld computers (also sometimes called personal digital assistants), remote controllers, global positioning system (GPS) devices, and handheld gaming devices. The wireless electronic devices may also be hybrid devices that combine the functionality of multiple conventional devices. Examples of hybrid portable electronic devices include a cellular telephone that includes media player functionality, a gaming device that includes a wireless communications capability, a cellular telephone that includes game and email functions, and a portable device that receives email, supports mobile telephone calls, has music player functionality and supports web browsing. These are merely illustrative examples.

Figure 1:
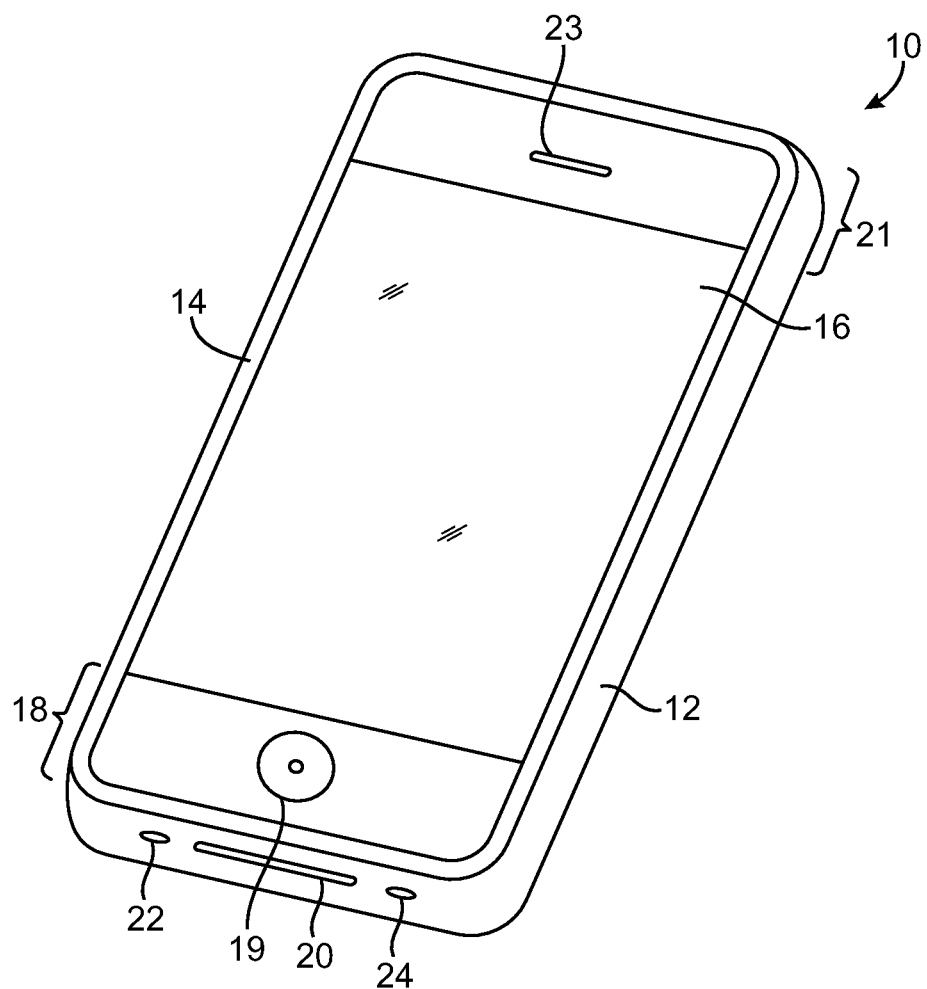
FIG. 1 is a perspective view of an illustrative portable electronic device in accordance with an embodiment of the present invention.

An illustrative portable electronic device in accordance with an embodiment of the present invention is shown in FIG. 1. Device 10 of FIG. 1 may be, for example, a handheld electronic device that supports 2G and/or 3G cellular telephone and data functions, global positioning system capabilities, and local wireless communications capabilities (e.g., IEEE 802.11 and Bluetooth®) and that supports handheld computing device functions such as internet browsing, email and calendar functions, games, music player functionality, etc.

Device 10 may have housing 12. Antennas for handling wireless communications may be housed within housing 12 (as an example).

Housing 12, which is sometimes referred to as a case, may be formed of any suitable materials including, plastic, glass, ceramics, metal, or other suitable materials, or a combination of these materials. In some situations, housing 12 or portions of housing 12 may be formed from a dielectric or other low-conductivity material, so that the operation of conductive antenna elements that are located in proximity to housing 12 is not disrupted. Housing 12 or portions of housing 12 may also be formed from conductive materials such as metal. An advantage of forming housing 12 from a dielectric material such as plastic is that this may help to reduce the overall weight of device 10 and may avoid potential interference with wireless operations.

In scenarios in which housing 12 is formed from metal elements, one or more of the metal elements may be used as part of the antennas in device 10. For example, metal portions of housing 12 may be shorted to an internal ground plane in device 10 to create a larger ground plane element for that device 10.

Housing 12 may have a bezel, such as bezel 14. Bezel 14 may be formed from a conductive material and may serve to hold a display or other device with a planar surface in place on device 10 and/or to form an esthetically pleasing trim around the edge of device 10.

Display 16 may be a liquid crystal diode (LCD) display, an organic light emitting diode (OLED) display, or any other suitable display. The outermost surface of display 16 may be formed from one or more plastic or glass layers. If desired, touch screen functionality may be integrated into display 16 or may be provided using a separate touch pad device. An advantage of integrating a touch screen into display 16 to make display 16 touch sensitive is that this type of arrangement can save space and reduce visual clutter.

Display screen 16 (e.g., a touch screen) is merely one example of an input-output device that may be used with electronic device 10. If desired, electronic device 10 may have other input-output devices. For example, electronic device 10 may have user input control devices such as button 19, and input-output components such as port 20 and one or more input-output jacks (e.g., for audio and/or video). Button 19 may be, for example, a menu button. Port 20 may contain a 30-pin data connector (as an example). Openings 22 and 24 may, if desired, form speaker and microphone ports. Speaker port 22 may be used when operating device 10 in speakerphone mode. Opening 23 may also form a speaker port. For example, speaker port 23 may serve as a telephone receiver that is placed adjacent to a user's ear during operation. In the example of FIG. 1, display screen 16 is shown as being mounted on the front face of handheld electronic device 10, but display screen 16 may, if desired, be mounted on the rear face of handheld electronic device 10, on a side of device 10, on a flip-up portion of device 10 that is attached to a main body portion of device 10 by a hinge (for example), or using any other suitable mounting arrangement.

A user of electronic device 10 may supply input commands using user input interface devices such as button 19 and touch screen 16. Suitable user input interface devices for electronic device 10 include buttons (e.g., alphanumeric keys, power on-off, power-on, power-off, and other specialized buttons, etc.), a touch pad, pointing stick, or other cursor control device, a microphone for supplying voice commands, or any other suitable interface for controlling device 10. Although shown schematically as being formed on the top face of electronic device 10 in the example of FIG. 1, buttons such as button 19 and other user input interface devices may generally be formed on any suitable portion of electronic device 10. For example, a button such as button 19 or other user interface control may be formed on the side of electronic device 10. Buttons and other user interface controls can also be located on the top face, rear face, or other portion of device 10. If desired, device 10 can be controlled remotely (e.g., using an infrared remote control, a radio-frequency remote control such as a Bluetooth® remote control, etc.).

Electronic device 10 may have ports such as port 20. Port 20, which may sometimes be referred to as a dock connector, 30-pin data port connector, input-output port, or bus connector, may be used as an input-output port (e.g., when connecting device 10 to a mating dock connected to a computer or other electronic device). Port 20 may contain pins for receiving data and power signals. Device 10 may also have audio and video jacks that allow device 10 to interface with external components. Typical ports include power pins to recharge a battery within device 10 or to operate device 10 from a direct current (DC) power supply, data pins to exchange data with external components such as a personal computer or peripheral, audio-visual jacks to drive headphones, a monitor, or other external audio-video equipment, a subscriber identity module (SIM) card port to authorize cellular telephone service, a memory card slot, etc. The functions of some or all of these devices and the internal circuitry of electronic device 10 can be controlled using input interface devices such as touch screen display 16.

Components such as display 16 and other user input interface devices may cover most of the available surface area on the front face of device 10 (as shown in the example of FIG. 1) or may occupy only a small portion of the front face of device 10. Because electronic components such as display 16 often contain large amounts of metal (e.g., as radio-frequency shielding), the location of these components relative to the antenna elements in device 10 should generally be taken into consideration. Suitably chosen locations for the antenna elements and electronic components of the device will allow the antennas of electronic device 10 to function properly without being disrupted by the electronic components.

Examples of locations in which antenna structures may be located in device 10 include region 18 and region 21. These are merely illustrative examples. Any suitable portion of device 10 may be used to house antenna structures for device 10 if desired.

Figure 2:
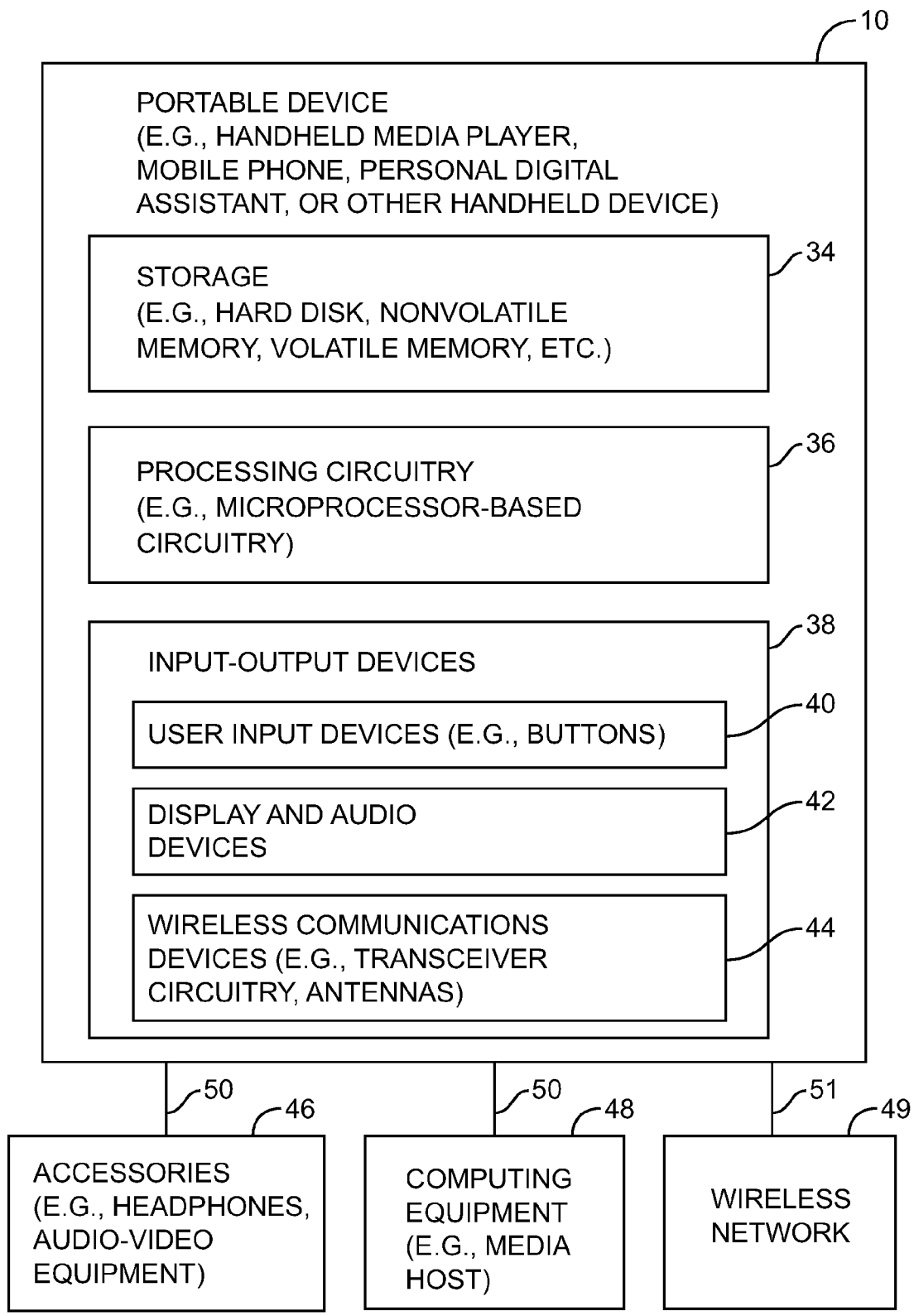
FIG. 2 is a schematic diagram of an illustrative portable electronic device in accordance with an embodiment of the present invention.

A schematic diagram of an embodiment of an illustrative portable electronic device such as a handheld electronic device is shown in FIG. 2. Portable device 10 may be a mobile telephone, a mobile telephone with media player capabilities, a handheld computer, a remote control, a game player, a global positioning system (GPS) device, a laptop computer, a tablet computer, an ultraportable computer, a hybrid device that includes the functionality of some or all of these devices, or any other suitable portable electronic device.

As shown in FIG. 2, device 10 may include storage 34. Storage 34 may include one or more different types of storage such as hard disk drive storage, nonvolatile memory (e.g., flash memory or other electrically-programmable-read-only memory), volatile memory (e.g., battery-based static or dynamic random-access-memory), etc.

Processing circuitry 36 may be used to control the operation of device 10. Processing circuitry 36 may be based on a processor such as a microprocessor and other suitable integrated circuits. With one suitable arrangement, processing circuitry 36 and storage 34 are used to run software on device 10, such as internet browsing applications, voice-over-internet-protocol (VOIP) telephone call applications, email applications, media playback applications, operating system functions, etc. Processing circuitry 36 and storage 34 may be used in implementing suitable communications protocols. Communications protocols that may be implemented using processing circuitry 36 and storage 34 include internet protocols, wireless local area network protocols (e.g., IEEE 802.11 protocols—sometimes referred to as Wi-Fi®), protocols for other short-range wireless communications links such as the Bluetooth® protocol, protocols for handling 3G communications services (e.g., using wide band code division multiple access techniques), 2G cellular telephone communications protocols, etc. To minimize power consumption, processing circuitry 36 may include power management circuitry to implement power management functions.

Input-output devices 38 may be used to allow data to be supplied to device 10 and to allow data to be provided from device 10 to external devices. Display screen 16, button 19, microphone port 24, speaker port 22, and dock connector port 20 are examples of input-output devices 38.

Input-output devices 38 can include user input-output devices 40 such as buttons, touch screens, joysticks, click wheels, scrolling wheels, touch pads, key pads, keyboards, microphones, cameras, etc. A user can control the operation of device 10 by supplying commands through user input devices 40. Display and audio devices 42 may include liquid-crystal display (LCD) screens or other screens, light-emitting diodes (LEDs), and other components that present visual information and status data. Display and audio devices 42 may also include audio equipment such as speakers and other devices for creating sound. Display and audio devices 42 may contain audio-video interface equipment such as jacks and other connectors for external headphones and monitors.

Wireless communications devices 44 may include communications circuitry such as radio-frequency (RF) transceiver circuitry formed from one or more integrated circuits, power amplifier circuitry, passive RF components, antennas, and other circuitry for handling RF wireless signals. Wireless signals can also be sent using light (e.g., using infrared communications).

Device 10 can communicate with external devices such as accessories 46, computing equipment 48, and wireless network 49 as shown by paths 50 and 51. Paths 50 may include wired and wireless paths. Path 51 may be a wireless path. Accessories 46 may include headphones (e.g., a wireless cellular headset or audio headphones) and audio-video equipment (e.g., wireless speakers, a game controller, or other equipment that receives and plays audio and video content), a peripheral such as a wireless printer or camera, etc.

Computing equipment 48 may be any suitable computer. With one suitable arrangement, computing equipment 48 is a computer that has an associated wireless access point (router) or an internal or external wireless card that establishes a wireless connection with device 10. The computer may be a server (e.g., an internet server), a local area network computer with or without internet access, a user's own personal computer, a peer device (e.g., another portable electronic device 10), or any other suitable computing equipment.

Wireless network 49 may include any suitable network equipment, such as cellular telephone base stations, cellular towers, wireless data networks, computers associated with wireless networks, etc. For example, wireless network 49 may include network management equipment that monitors the wireless signal strength of the wireless handsets (cellular telephones, handheld computing devices, etc.) that are in communication with network 49.

The antenna structures and wireless communications devices of device 10 may support communications over any suitable wireless communications bands. For example, wireless communications devices 44 may be used to cover communications frequency bands such as cellular telephone voice and data bands at 850 MHz, 900 MHz, 1800 MHz, 1900 MHz, and 2100 MHz (as examples). Devices 44 may also be used to handle the Wi-Fi® (IEEE 802.11) bands at 2.4 GHz and 5.0 GHz (also sometimes referred to as wireless local area network or WLAN bands), the Bluetooth® band at 2.4 GHz, and the global positioning system (GPS) band at 1575 MHz.

To facilitate manufacturing operations, device 10 may be formed from two intermediate assemblies, representing upper and lower portions of device 10. The upper or top portion of device 10 may sometimes be referred to as a tilt assembly. The lower or bottom portion of device 10 may sometimes be referred to as a housing assembly.

The tilt and housing assemblies are each formed from a number of smaller components. For example, the tilt assembly may be formed from components such as display 16 and an associated touch sensor. The housing assembly may include a plastic housing portion such as plastic housing portion 12 and printed circuit boards. Integrated circuits and other components may be mounted on the printed circuit boards. During manufacturing, one end of the tilt assembly may be inserted into the housing assembly. The tilt assembly may then be rotated ("tilted") into place so that the upper surface of the tilt assembly lies flush with the upper edges of the housing assembly.

Figure 3:
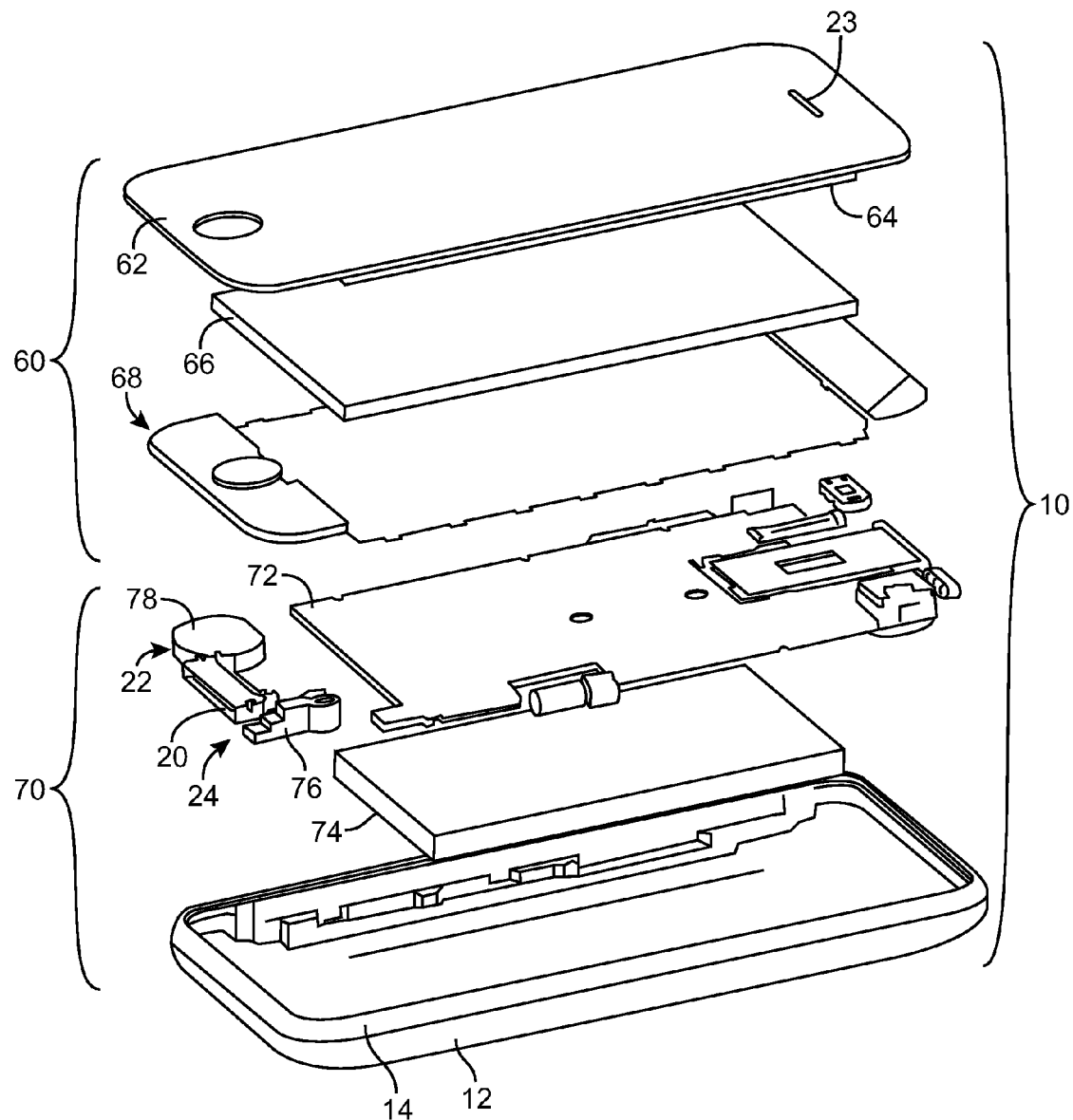
FIG. 3 is an exploded perspective view of an illustrative portable electronic device in accordance with an embodiment of the present invention.

An exploded perspective view showing illustrative components of device 10 is shown in FIG. 3.

Tilt assembly 60 (shown in its unassembled state in FIG. 3) may include components such as cover 62, touch sensitive sensor 64, display unit 66, and frame 68. Cover 62 may be formed of glass or other suitable transparent materials (e.g., plastic, combinations of one or more glasses and one or more plastics, etc.). Display unit 66 may be, for example, a color liquid crystal display. Frame 68 may be formed from one or more pieces. With one suitable arrangement, frame 68 may include metal pieces to which plastic parts are connected using an overmolding process. If desired, frame 68 may be formed entirely from plastic or entirely from metal.

Housing assembly 70 (shown in its unassembled state in FIG. 3) may include housing 12. Housing 12 may be formed of plastic and/or other materials such a metal (metal alloys). For example, housing 12 may be formed of plastic to which metal members are mounted using fasteners and/or a plastic overmolding process. Bezel 14 may be formed of plastic or other dielectric materials or may be formed from metal or other conductive materials. Housing assembly 70 may also include one or more printed circuit boards such as printed circuit board 72. Housing assembly 70 may also include components such as microphone 76 for microphone port 24, speaker 78 for speaker port 22, and dock connector 20, integrated circuits, a camera, ear speaker for port 23, audio jack, buttons, SIM card slot, etc.

Device 10 contains numerous electronic components such as printed circuit board 72, integrated circuits (ICs) mounted on board 72, display unit 66, touch sensor 64, a camera, etc. These components are moisture sensitive. Too much moisture can create unintended low resistance connections, or short circuits, between nodes that are meant to be at different voltages, making the circuits perform unpredictably or fail. For that reason, many portable electronic devices utilize structures for inhibiting moisture infiltration into the device. Such structures may include gaskets and moisture-repellent treatments to prevent water or moisture ingress into a device. Despite these safeguards, a portable electronic device may have sufficient moisture infiltration to cause the device to fail if, perhaps, the device is inadvertently immersed in water or a liquid is spilled on the device.

When a portable device has failed or is not operating in a normal manner, it is important to quickly and easily identify that the device malfunction is related to moisture exposure. Convenient moisture infiltration indicators allows technicians to ascertain the moisture exposure history of the device. This facilitates troubleshooting and allows a business to evaluate warranty claims.

Various systems for indicating the moisture infiltration status of an electronic device have been used in the past. Many include use of a moisture indicating structure (often referred to as a "water dot") in the interior of the device, sometimes under replaceable batteries. These systems have some drawbacks. While providing an indication that moisture had infiltrated the interior of the device and likely in proximity to the moisture-sensitive circuitry, it is inconvenient to access the moisture indicating substance to examine it as, many times, a device cover and batteries need to be removed.

Figure 4:
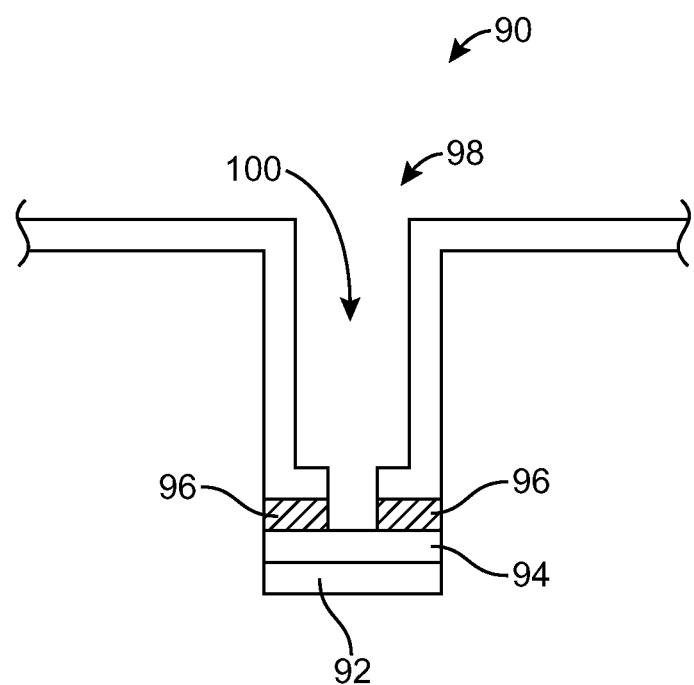
FIG. 4 is a cross-sectional view of a conventional moisture indicating device located at the bottom of an audio jack.

Other systems have provided a water dot viewable from the exterior of the device, making it more convenient for examination. FIG. 4 is a cross-sectional view of a conventional moisture indication system, such as system 90 of this type. System 90 has a water dot made up of red dye layer 92 and white wicking layer 94, attached at the base of audio jack 98 with adhesive 96. Audio jack 98 has an audio jack opening 100 for receiving an audio plug or other type of plug. When the water dot becomes wet, the red dye from layer 92 colors white layer 94. This provides a visual indication that the device has become wet. The status of the water dot can be examined by viewing the color of layer 94 through audio jack 90.

This system has drawbacks, however. While it may provide an external visual indication of water penetration by manually examining the moisture indicating substance through audio jack opening 100, it may be difficult to view as audio jack openings are generally small in diameter as compared to their depth. Another drawback is that audio jack 98 may be physically away from many water sensitive components so that a water infiltration indication at audio jack 98 may have no bearing on whether the water reached the water sensitive circuitry. Yet another drawback is that audio jack 98, due to its shape coupled with its typical location (on the top of the device), may act a water collection well giving a false indication of water infiltration into the interior of the device. Moreover, when in use, a cord for headphones, as a typical use example, may act as a water conduit in that water landing anywhere along the cord may track down the cord into the audio jack well. This could provide an indication of water infiltration in the jack area but possibly not in the interior of the device near the electronic circuitry. Jack 98 may also be blocked during normal use making the water dot arrangement of FIG. 4 insufficiently sensitive.

Figure 5:
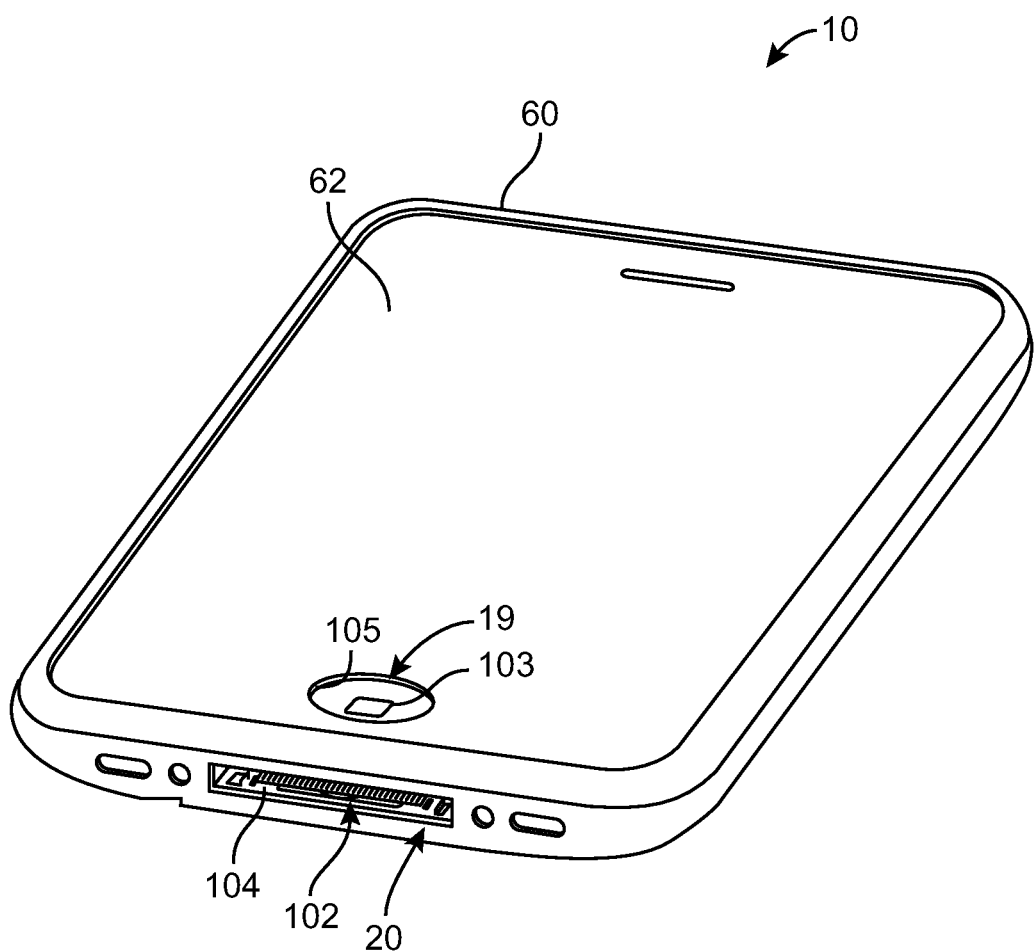
FIG. 5 is a perspective view of an illustrative portable electronic device in accordance with an embodiment of the present invention.

FIG. 5 provides a perspective view of an illustrative portable electronic device having a moisture infiltration indication system in accordance with embodiments of the present invention. Portable electronic device 10 may have a port, such as port 20. Port 20 may have connector assembly 104 for receiving a mating plug, such as a 30-pin data port connector plug. Port 20, together with connector assembly 104, may sometimes be referred to as a dock connector, 30-pin data port connector, input-output port, or bus connector. Connector assembly 104 may be provided with a moisture infiltration indication structure (e.g., structure 102).

Portable electronic device 10 may also have tilt assembly 60, which may include cover 62. Cover 62 may be formed of glass or other suitable transparent materials (e.g., plastic, combinations of one or more glasses and one or more plastics, etc.). Cover 62, while providing viewing access to a display, may also provide some water, shock and other protection for the electronics of the device. Cover 62 may also provide a menu button opening, such as opening 105, for menu button 19. Menu button 19 may have a transparent covering. If desired, buttons such as menu button 19 may be provided with a moisture infiltration indicator (e.g., indicator 103) in addition to or instead of a dock connector indicator such as indicator 102.

Figure 6:
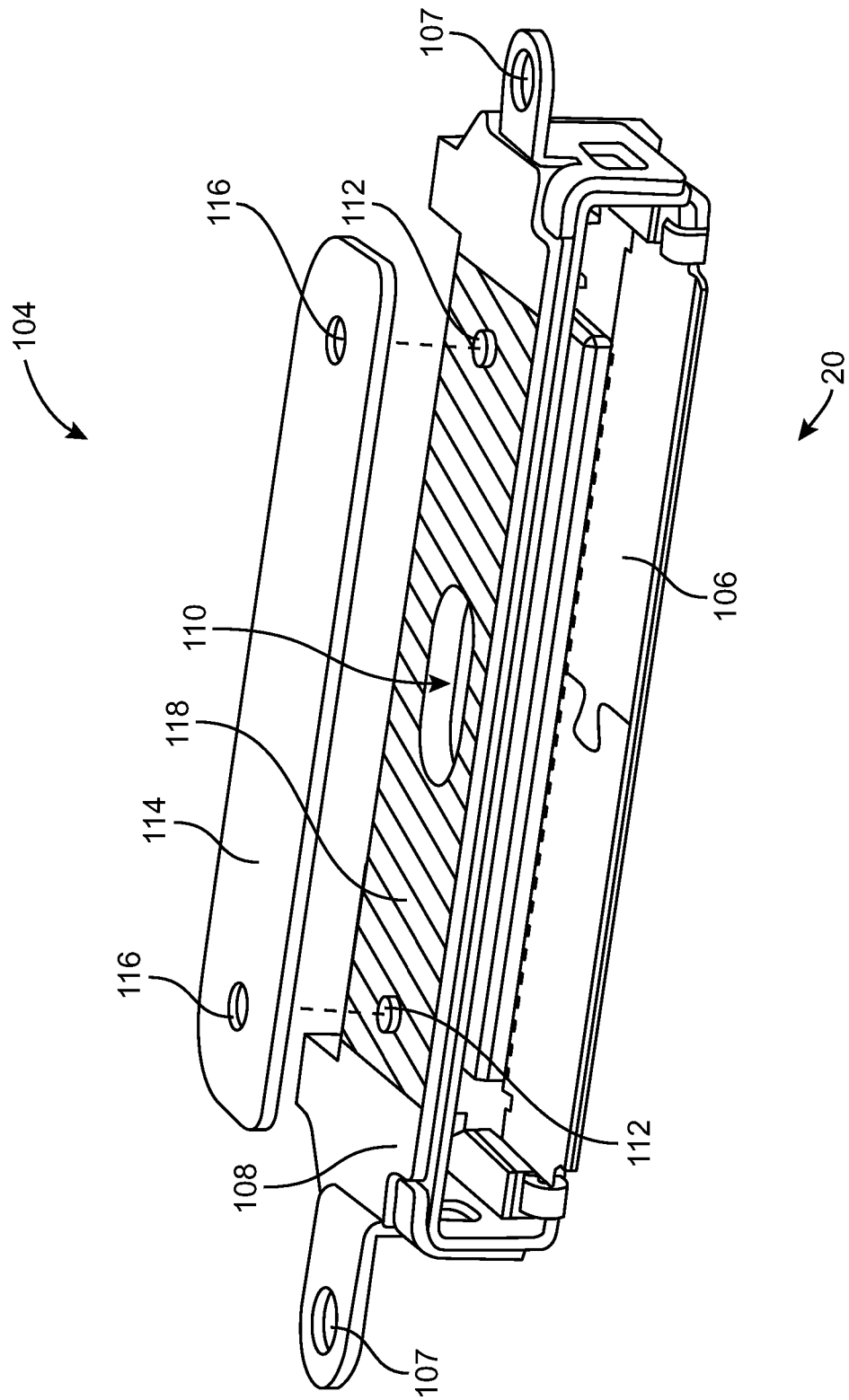
FIG. 6 is an exploded perspective view of an illustrative dock connector having a moisture infiltration indication system in accordance with one embodiment of the present invention.

An exploded bottom perspective view showing illustrative components of connector assembly 104 is shown in FIG. 6 for illustrating an embodiment of moisture infiltration indication system 102 of the present invention.

Connector assembly 104 of device 10 has frame 106, which is a structural system that supports other components of connector assembly 104, and moisture indication structure 114 (sometimes referred to as a water dot or water dot layer). Frame 106 has mounting holes 107 for allowing connector assembly 104 to be mounted within port 20. Frame 106 may be formed from one or more pieces. With one suitable arrangement, frame 106 may include metal pieces to which plastic parts, such as viewing hole structure 108, are connected using an overmolding process. If desired, frame 106 may be formed entirely from plastic or entirely from metal. In the example of FIG. 6, viewing hole structure 108 is a plastic overmold connected to frame 106. Viewing hole structure 108 has viewing hole 110 located near the center of viewing hole structure 108. Viewing hole 110 may be of any size and shape and may be placed in any location so that lows viewing of moisture exposure status from outside of device 10 through port 20. In the FIG. 6 example, a user can view the color of the underside of indicator 114 through the opening of dock connector 20 and hole 110.

Viewing hole structure 108 may further have alignment posts 112 located on each end of viewing hole structure 108 and on each side of viewing hole 110. The location of alignment posts 112 may be in any suitable location to align a moisture indication structure such as structure 114 to be positioned so that it covers viewing hole 110 when installed.

Moisture indication structure 114 has alignment holes 116 that, together with alignment posts 112, align moisture indication structure 114 so that it covers viewing hole 110. Moisture indication structure 114 provides a visual indication, generally by changing colors (e.g., from white to red) when moisture comes into contact with it. Moisture indication structure 114 is connected to viewing hole structure 108 by an adhesive such as adhesive layer 118. Adhesive layer 118 may be of any suitable adhesive material such as two-sided pressure sensitive adhesive film (double sided tape), an adhesive without film backing etc.

Figure 7:
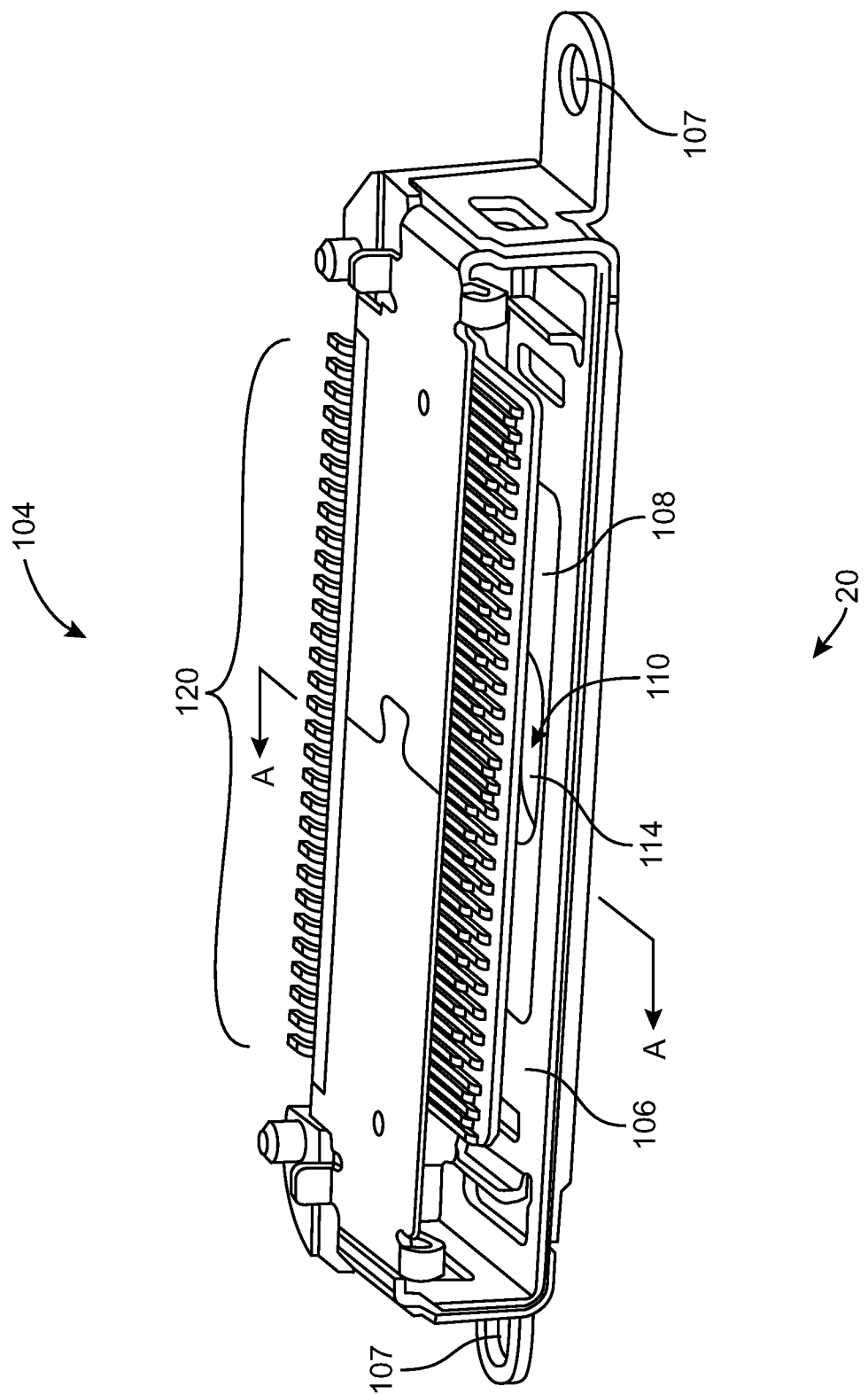
FIG. 7 is a perspective view of an illustrative dock connector having a moisture infiltration indication system in accordance with an embodiment of the present invention.

A top perspective view of connector assembly 104 is shown in FIG. 7, illustrating how viewing hole structure 108 may have a viewing hole such as viewing hole 110 so that moisture indication structure 114 may be viewed from the exterior of the device without disassembly. Connector assembly 104 further has pins 120. There may be any suitable number of pins, or contacts, such as 30 pins as in a rectangular 30-pin dock connector. With the 30-pin dock connector, an electronic device (i.e., device 10) such as an Apple® iPod® mobile digital device, can be charged, connected to a personal computer via a Universal Serial Bus (USB) path, connected to audio equipment, etc. Device 10 may be use with other suitable connector types if desired.

Figure 8:
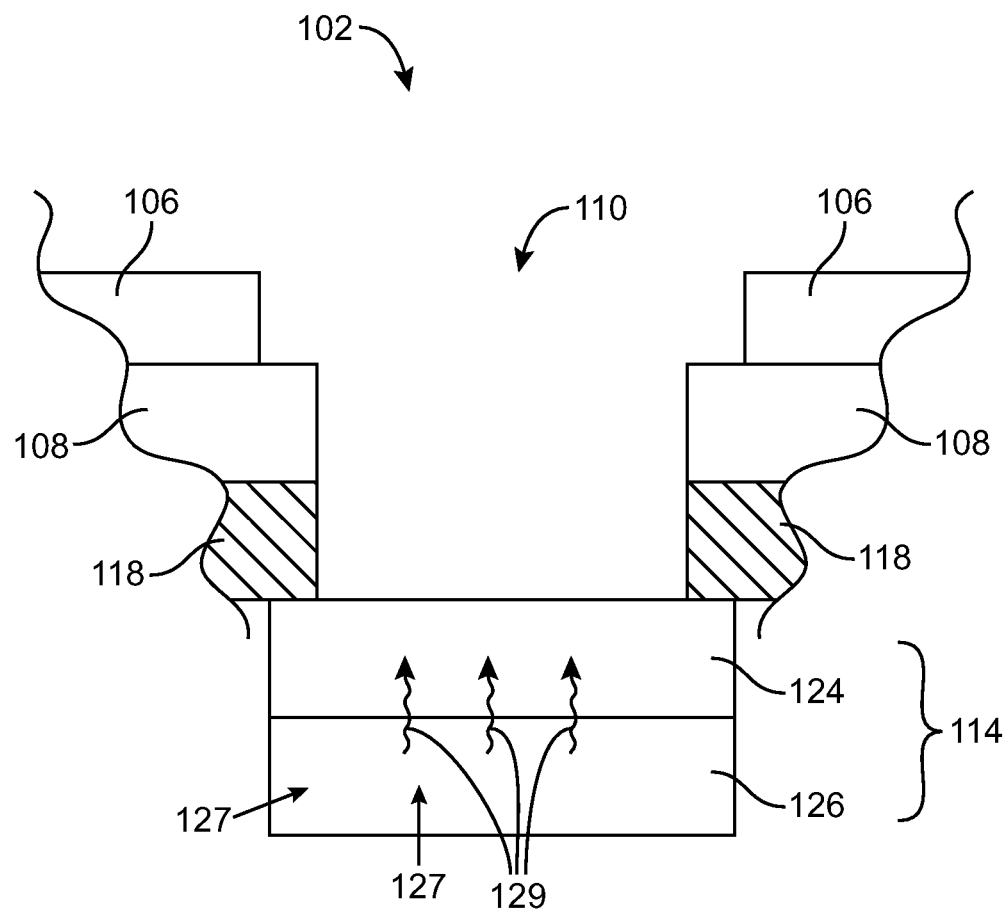
FIG. 8 is a cross-sectional side view of a dock connector moisture infiltration indication system without moisture barrier layers in accordance with an embodiment of the present invention.

A cross-sectional side view A-A of FIG. 7 of an illustrative arrangement for a dock connector moisture infiltration indication system such as system 102 is shown in FIG. 8. System 102 of FIG. 8 has frame 106 connected to viewing hole structure 108 providing viewing hole 110. Adhesive layer 118 bonds moisture indication structure 114 to viewing hole structure 108. Moisture indication structure 114 has two layers—wicking layer 124 and dyeing layer 126. Wicking layer 124 is made of a wicking material that provides a capillary action or the ability to draw another substance, in this case moisture, into it. Wicking layer 124 has a prespecified color when dry and no foreign substance has been wicked into it. The wicking layer 124 "unwicked" color is typically white but could also be gray, a light color, etc.

Dyeing layer 126 is adjacent to wicking layer 124. Dyeing layer 126 is made of a dry dye, or colored substance, of a predefined color, typically red. When dyeing layer 126 is in dry form, wicking layer 124 has no wicking ability so that the two remain separated. Once dyeing layer 126 becomes moist or wet as shown by moisture arrows 127, the dry dye becomes wet and is wicked into wicking layer 124 as shown by dye wicking arrows 129.

Wicking layer 124 is viewable through viewing hole 110. When there has been no moisture infiltration of the dry red dye, wicking layer 124 appears white through viewing hole 110 as no wicking has occurred. However, when moisture infiltrates the dry red dye, the red dye, now wet, wicks into and through wicking layer 124 such that a red color of wicking layer 124 is apparent through viewing hole 108. Once the red dye has been wicked into wicking layer 124, it will remain there even after wicking layer 124 dries.

Figure 9:
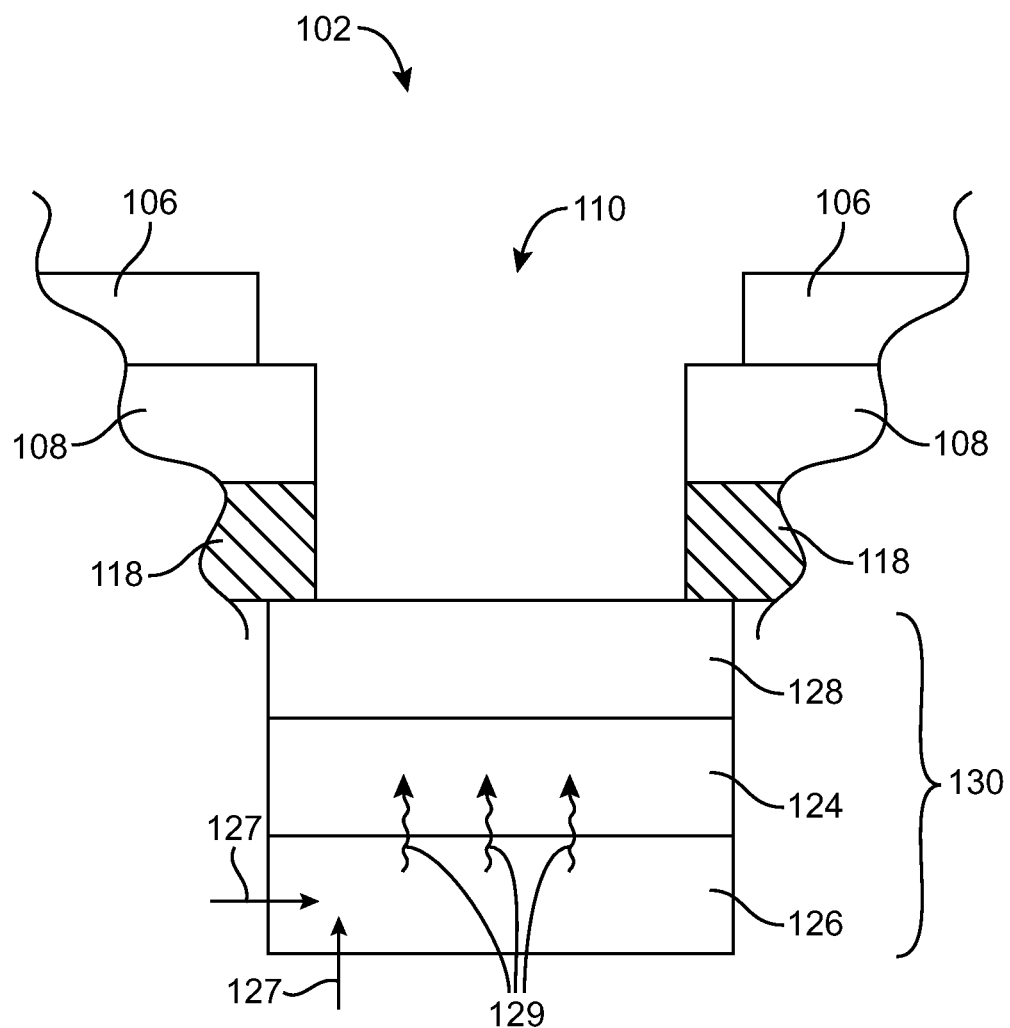
FIG. 9 is a cross-sectional side view of a dock connector moisture infiltration indication system with an upper moisture barrier layer in accordance with an embodiment of the present invention.

A cross-sectional side view A-A of a dock connector moisture infiltration indication system 102 is shown in FIG. 9. As in FIG. 8, system 102 of FIG. 9 has frame 106 with overmolded viewing hole structure 108 providing viewing hole 110.

In the arrangement of FIG. 9, adhesive layer 118 bonds to another moisture indication structure 130 to viewing hole structure 108. Moisture indication structure 130 has three layers—wicking layer 124, dyeing layer 126 and an upper moisture barrier layer 128. Upper moisture barrier layer 128 may be formed of any suitable moisture repellent material such as polyethylene terephthalate (PET). Upper moisture barrier layer 128 provides a printable surface allowing the addition of code numbers, logos and other artwork. It also may be used to protect wicking layer 124 from soiling and moisture during handling.

Because upper moisture barrier layer 128 provides a moisture barrier to moisture indication structure 114, it helps to prevent moisture from infiltrating wicking layer 124 and dyeing layer 126 through viewing hole 110. The moisture barrier qualities of upper moisture barrier layer 128, coupled with its adhesion to adhesive layer 118, which itself may have high moisture barrier qualities, provides moisture protection from the viewing hole thereby preventing the moisture indicator from being triggered by contact with low levels of moisture. By contrast, moisture from the interior of the device (moisture arrows 127), which arises when device 10 has been exposed to substantial amounts of moisture, may more easily infiltrate dyeing layer 126 activating the dye so that it is wicked (arrows 129) into wicking layer 124.

The use of upper moisture barrier layer 128 lowers the sensitivity of moisture indication structure 130 with respect to moisture from viewing hole 110 as compared to the structure of the type described in connection with FIG. 8. The addition of upper moisture barrier layer 128 therefore aids in the prevention of false indications—that is, indications that moisture has infiltrated the device when, in fact, moisture may have only infiltrated viewing hole 110 while the remainder of device may have remained dry.

Figure 10:
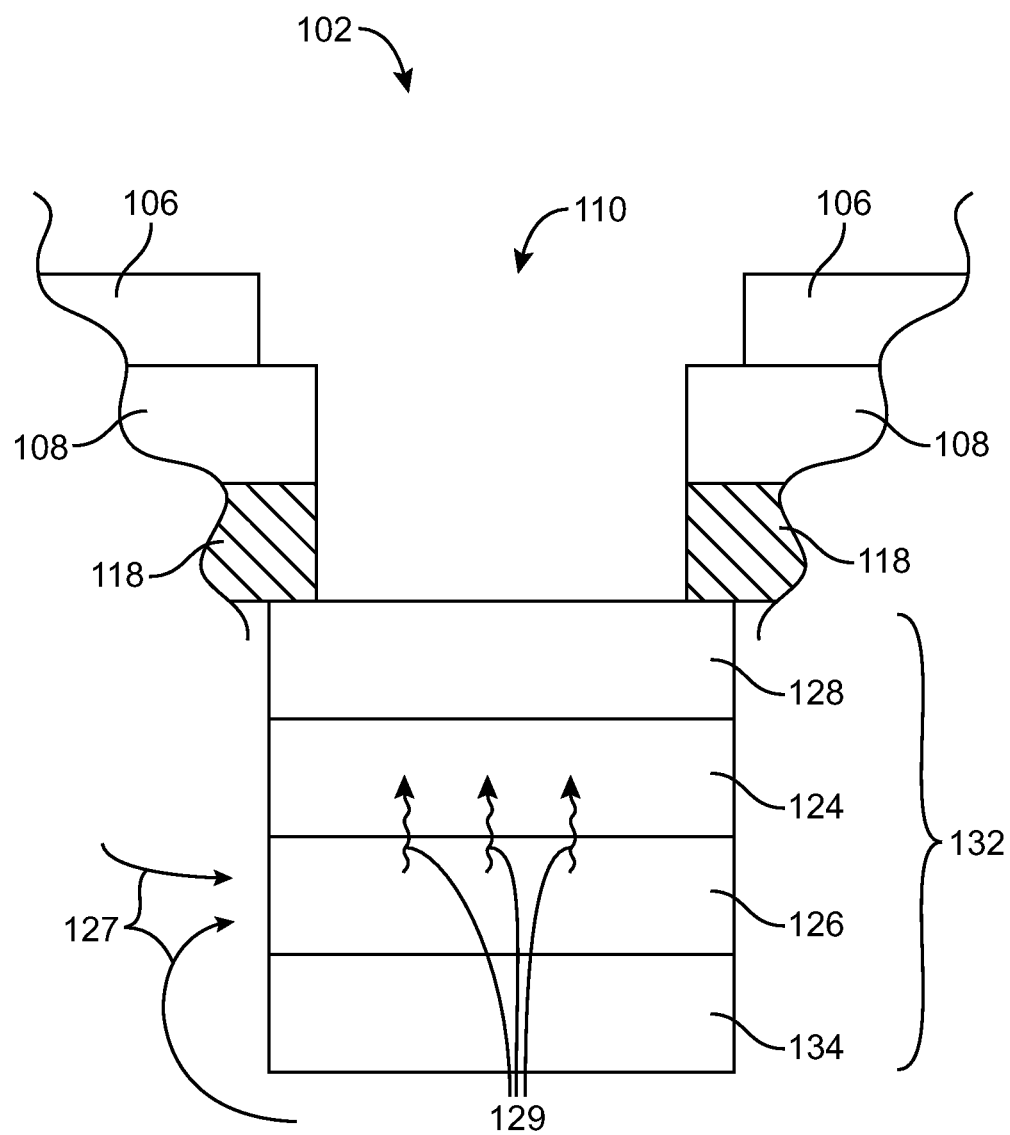
FIG. 10 is a cross-sectional side view of a dock connector moisture infiltration indication system with upper and lower moisture barrier layers in accordance with an embodiment of the present invention.

A cross-sectional side view A-A of a dock connector moisture infiltration indication system such as system 102 in accordance with another embodiment of the present invention is shown in FIG. 10. As in the systems shown in FIGS. 8 and 9, system 102 of FIG. 10 has frame 106 with overmolded viewing hole structure 108 providing viewing hole 110.

In this embodiment, adhesive layer 118 bonds to different moisture indication structure 132 to viewing hole structure 108. Moisture indication structure 132 has four layers—wicking layer 124, dyeing layer 126, upper moisture barrier layer 128 and lower moisture barrier layer 134. Lower moisture barrier layer 134 may be made of the same material as upper moisture barrier layer or other suitable materials can be used. Like upper moisture barrier layer 128, lower moisture barrier layer 134 has moisture barrier qualities. Lower moisture barrier layer 134 forms a moisture barrier on the underside of moisture indication structure 132 towards the interior of device 10. This inhibits moisture from the inside of the device from infiltrating dyeing layer 126. This lowers even further the sensitivity of moisture indication structure 114 with respect to moisture—as it has moisture barriers for both external and internal moisture.

As in the structure of the type shown in FIG. 9, moisture from viewing hole 110 of FIG. 10 is sufficiently inhibited by upper moisture barrier layer 128 and adhesive layer 118. This lowers the sensitivity of moisture indication structure 132 with respect to moisture from viewing hole 110.

In the interior of the device, due to the moisture barrier qualities of lower moisture barrier layer 134, moisture 127 must pass around lower moisture barrier layer 134 in order to activate dyeing layer 126 so that dye 129 is wicked into wicking layer 124. In contrast to upper moisture barrier layer 128, lower moisture barrier layer 134 may have sides that are exposed to the interior of the device thereby providing a path to moisture indication structure 132. Because the lower face of moisture indication structure 132 has a moisture barrier, more interior device moisture is necessary in order to activate moisture indication structure 132.

Upper moisture barrier layer 128 aids in the prevention of false indications from viewing hole 110 while lower moisture barrier layer 134 raises the interior moisture threshold for moisture indication structure 132 to be activated. This is especially helpful in a situation where the moisture indication structure is too sensitive giving an unacceptably high rate of false indications. It is helpful in the situation where the circuitry of the device is especially tolerant of moisture, perhaps because of superior moisture protection in the immediate surroundings of the circuitry. It can also be helpful where moisture indication structure 132 is physically located in an area prone to water infiltration in contrast to the remainder of the device.

Lower moisture barrier layer 134 (and, if desired, upper moisture barrier layer 128) may be chosen to be of a material having a higher or lower porosity value so that more or less moisture may pass through lower moisture barrier layer 134. In this way, the moisture detection threshold of moisture indication structure 132 for moisture internal to a device may be adjusted downwardly or upwardly by a device designer. A material having a porosity value greater than the approximate porosity value of polyethylene terephthalate (PET) may sometimes be considered to be semi-porous.

Figure 11:
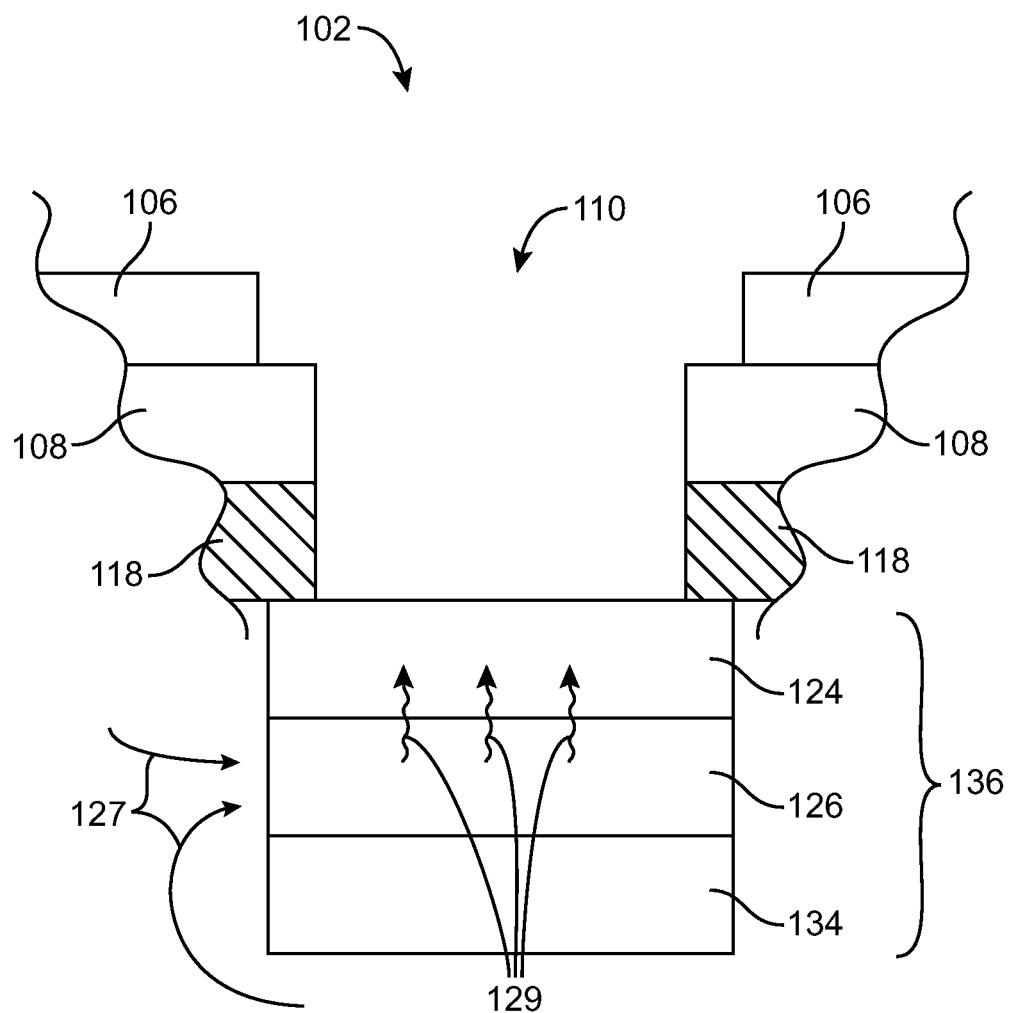
FIG. 11 is a cross-sectional side view of a dock connector moisture infiltration indication system with a lower moisture barrier layer in accordance with an embodiment of the present invention.

A cross-sectional side view A-A of a dock connector moisture infiltration indication system 102 in accordance with another embodiment of the present invention is shown in FIG. 11. As in the systems of FIGS. 8, 9, and 10, system 102 of FIG. 11 has frame 106 with overmolded viewing hole structure 108 providing viewing hole 110.

In this embodiment, adhesive layer 118 attaches moisture indication structure 136 to viewing hole structure 108. Moisture indication structure 136 has three layers—wicking layer 124, dyeing layer 126 and lower moisture barrier layer 134. Lower moisture barrier layer 134 forms a moisture barrier on the underside of moisture indication structure 132, inhibiting moisture infiltration of dyeing layer 126 from the interior of the device. However, because there is no moisture barrier on the viewing hole side of moisture indication structure 136, moisture indication structure 136 has high sensitivity with respect to moisture from viewing hole 110—thereby providing an indication if moisture is entering into device via connector assembly 104 and port 20.

Buttons such as menu button 19 may provide another external viewing point for a moisture infiltration indication system. Menu buttons may have transparent menu button covers. Moisture infiltration indication system 103 in this type of arrangement can be externally viewed.

Figure 12:
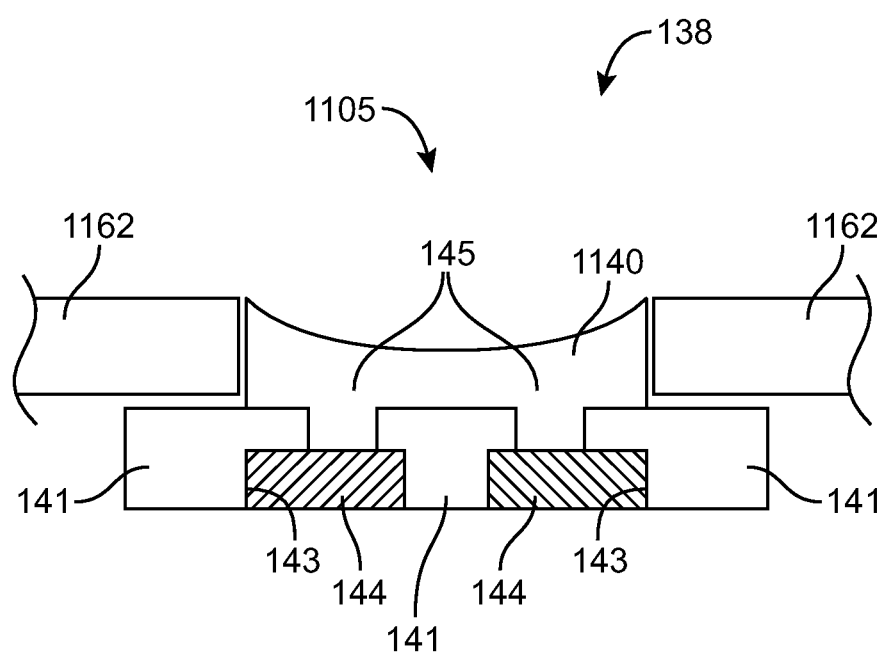
FIG. 12 is a cross-sectional side view of an upper portion of a conventional menu button.

A conventional menu button is shown in FIG. 12 in a cross-sectional side view. The menu button of FIG. 12 has cover 1162 having menu button opening 1105 having transparent menu button cover 1140 and opaque lower button layer 141. Located adjacent to and beneath cover 162 is a switch that is actuated when the button is pressed. Layer 141, which is black, has an opening 143 for holding a white patterned button portion 144. Portion 144 forms a white square when viewed from the front face of the device through viewing aperture 145 of transparent layer 1140. The white color of portion 144 is formed from white paint.

Figure 13:
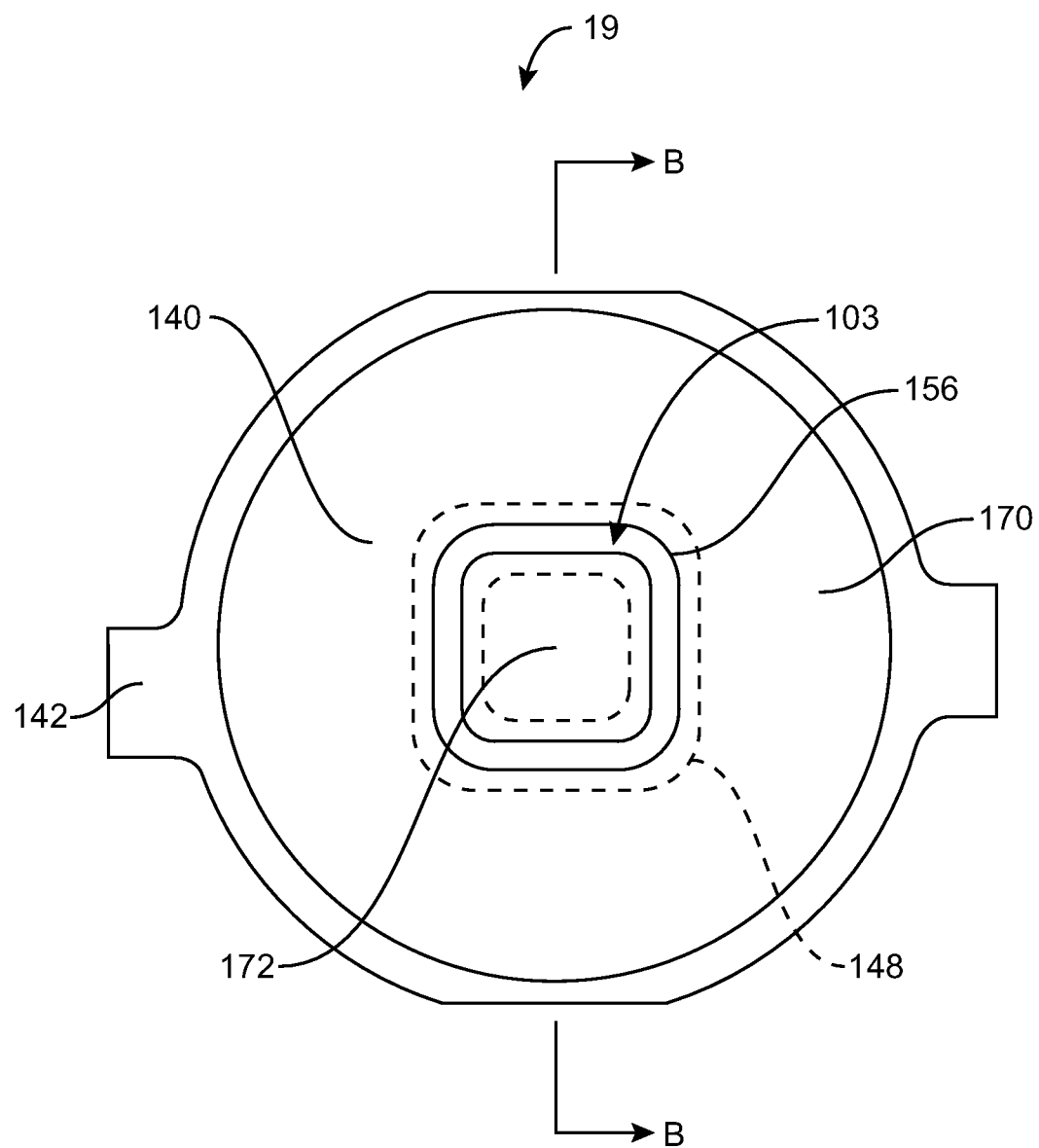
FIG. 13 is a top view of a menu button moisture infiltration indication system in accordance with an embodiment of the present invention.

FIG. 13 is a top view of menu button 19 that has a menu button moisture infiltration indication system in accordance with an embodiment of the present invention. Menu button 19 may have transparent menu button cover 140 covering lower button layer 142 and menu button moisture infiltration indication system 103. Button layer 142 may be formed of plastic or other suitable material and may be black in color or any other suitable color. Menu button moisture infiltration indication system 103 may have moisture indication structure 146 that is viewable through opening 156. Adhesive ring 148 may be used to attach the moisture indicator to button 19.

In this embodiment, the visible portion of the moisture indication structure is in the shape of a ring-shaped square. A pattern such as this for example may be used to form a logo. Outside of the moisture indication structure pattern is outer portion 170 provided by opaque button layer 142. Inside of the moisture indication region is inner portion 172 provided by opaque button layer 142. Opaque button layer and the wicking portions of the moisture indicator have any suitable colors. For example, opaque button layer 142 may be black and moisture indication structure 146 may be white (as an example). This allows a white pattern such as a ring-shaped square to be viewed through a transparent menu button cover, such as cover 140.

Figure 14:
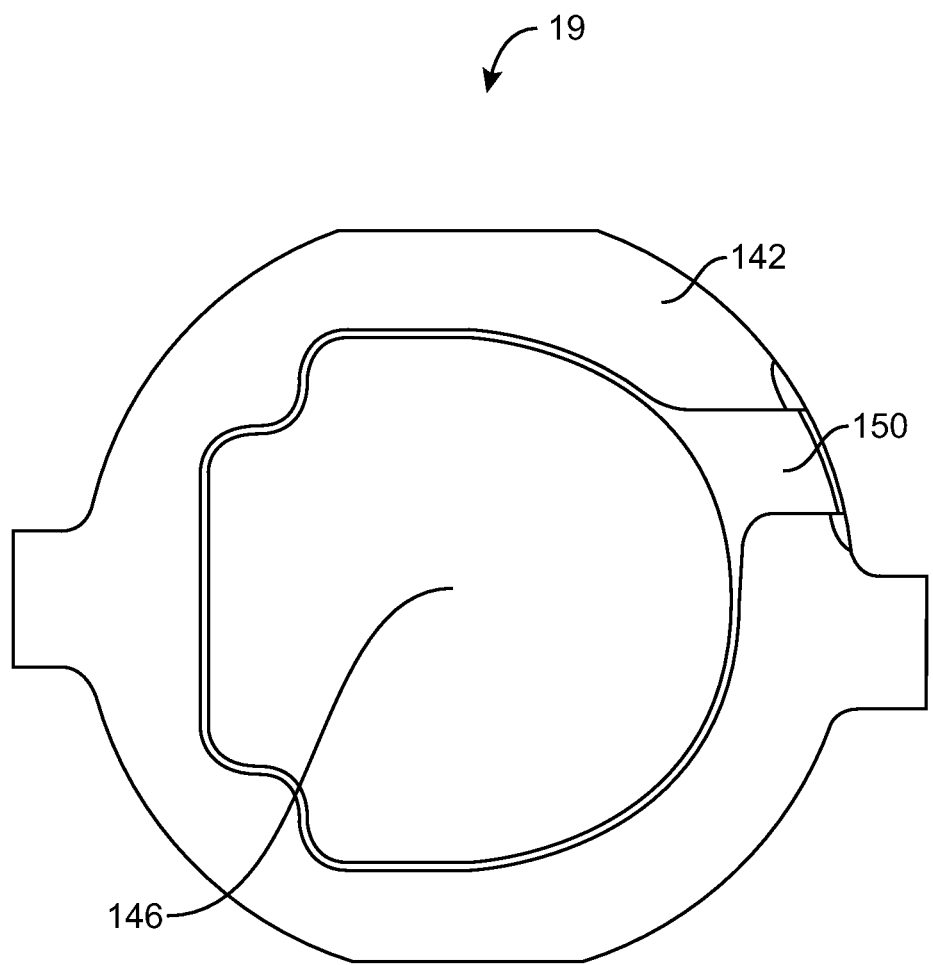
FIG. 14 is a bottom view of a menu button moisture infiltration indication system in accordance with an embodiment of the present invention.

A bottom view of menu button 19 having a moisture indication structure is shown in FIG. 14. Menu button 19 of FIG. 14 has opaque button layer 142 having a flexible printed circuit alignment and access portion 150. Menu button 19 further has moisture indication structure 146.

Figure 15:
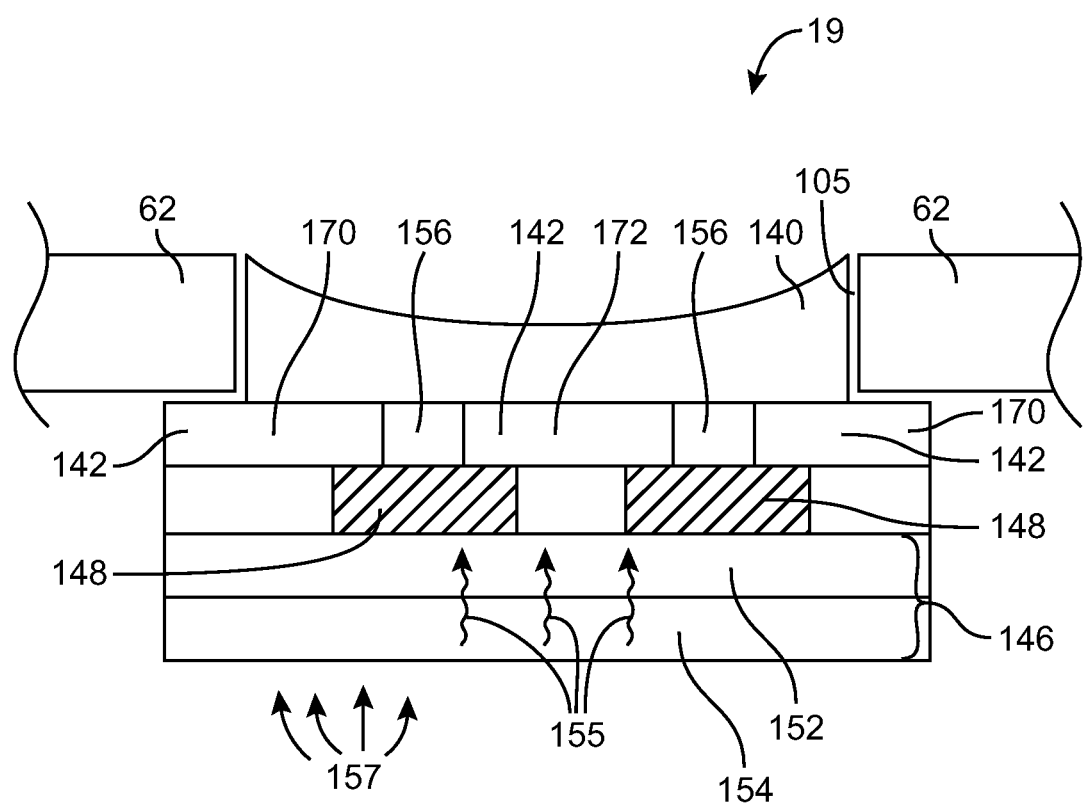
FIG. 15 is a cross-sectional side view of a menu button moisture infiltration indication system without a lower moisture barrier layer in accordance with an embodiment of the present invention.

A cross-sectional side view taken along B-B of FIG. 13 is shown in FIG. 15. Menu button 19 may be mounted within a device structure such as cover glass 62 having menu button opening 105. Transparent menu button cover 140 is connected to opaque button layer 142. With one suitable arrangement, transparent layer 140 and opaque layer 170 are formed using a two-shot plastic molding process. Transparent upper layer 140 and opaque lower layer 142 reciprocate vertically within menu button opening 105.

Moisture indication structure viewing aperture 156 may be formed in a ring (as shown in FIG. 14) or other suitable pattern. Adhesive ring 148, which is transparent, adheres moisture indication structure 146 to button layer 142. The outline of adhesive ring 148 is shown by the dashed lines in FIG. 13. Adhesive ring 148 may be formed of any suitable adhesive material such as transparent two-sided pressure sensitive adhesive film, contact adhesive, etc.

Moisture indication structure 146 has two layers: wicking layer 152 and dyeing layer 154. Wicking layer 152 provides the wicking action of wet dye 155 for moisture indication structure 146 when dyeing layer 154 becomes wet from moisture 157. Once exposed to moisture, moisture indication structure 146 changes its appearance from a first appearance (white) to a second appearance (red) due to the wicked dye.

Because transparent menu button cover 140 and adhesive ring 148 are transparent and button layer 142 provides viewing aperture 156, the status of wicking layer 152 is externally viewable through menu button opening 105. Viewing aperture 156 is in the shape of a ring-shaped square between outer portion 170 and inner portion 172 of layer 142. Wicking layer 152 is of a predetermined color, generally white, and button layer 142 is of a predetermined color, generally black. Together, they provide the appearance of a white square against a black background through transparent menu button cover 140 and viewing aperture 156 when no moisture has infiltrated the device. Wicking layer 152 remains white as dyeing layer 154 remains dry and no wicking can occur. However, when moisture infiltrates the dry red dye, the red dye, now wet, wicks through wicking layer 152 such that a red color is apparent through viewing aperture 156. Once the red dye has been wicked into wicking layer 152, it will remain there even after wicking layer 152 dries. This provides a readily apparent visual indication (a red ring-shaped square icon pattern) that moisture infiltration has occurred in the device.

Figure 16:
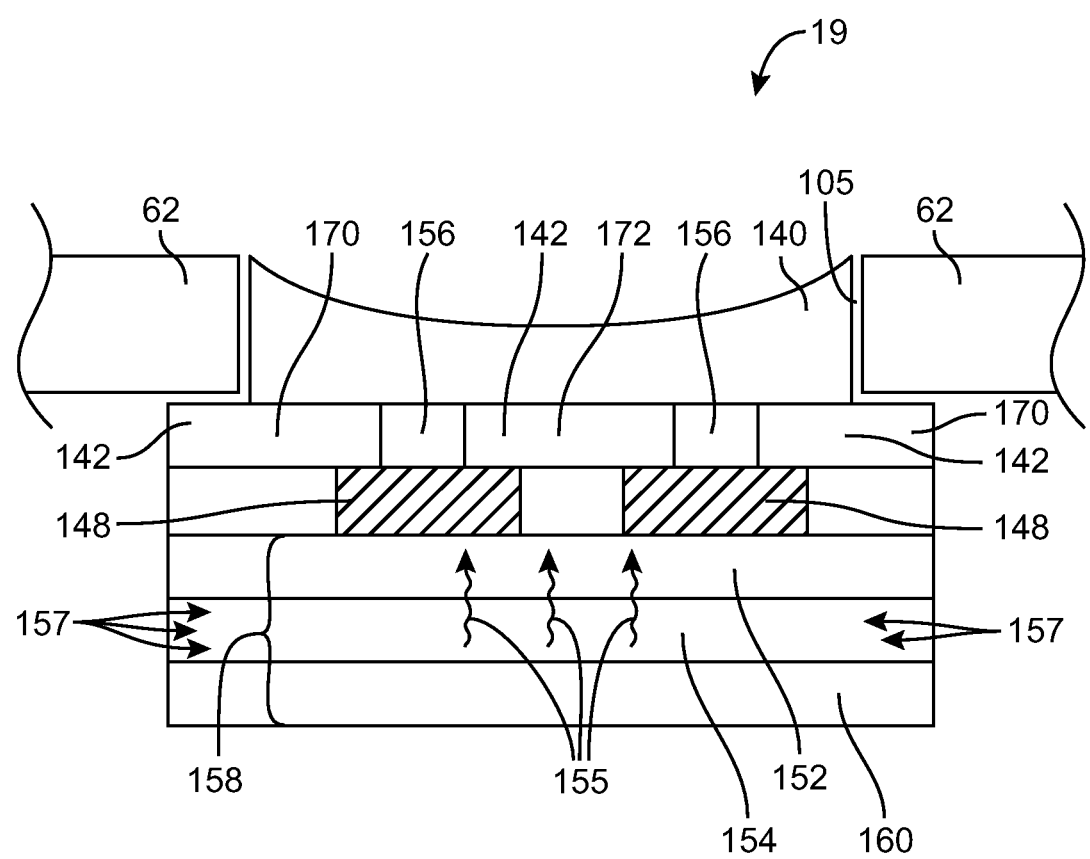
FIG. 16 is a cross-sectional side view of a menu button moisture infiltration indication system with a lower moisture barrier layer in accordance with an embodiment of the present invention.

FIG. 16 is a cross-sectional side view of another menu button moisture indication structure. Menu button 19 may be mounted within case 62 having menu button opening 105. Transparent menu button cover 140 forms the top part of menu button opening 105. Layer 140 may be formed of clear plastic or other suitable material.

Button 19 may have an opaque layer 142. Moisture indication structure viewing aperture 156 may be formed in layer 142. This opening may have any suitable shape. Moisture indication structure 158 is adhered to button layer 142 by adhesive ring 148. Moisture indication structure 158 has three layers: wicking layer 152, dyeing layer 154 and lower moisture barrier layer 160. Layer 160 may provide a moisture barrier for moisture indication structure 158 from moisture 157 intruding from the interior of the device, i.e., to reduce the sensitivity of the moisture indicator.

Figure 17:
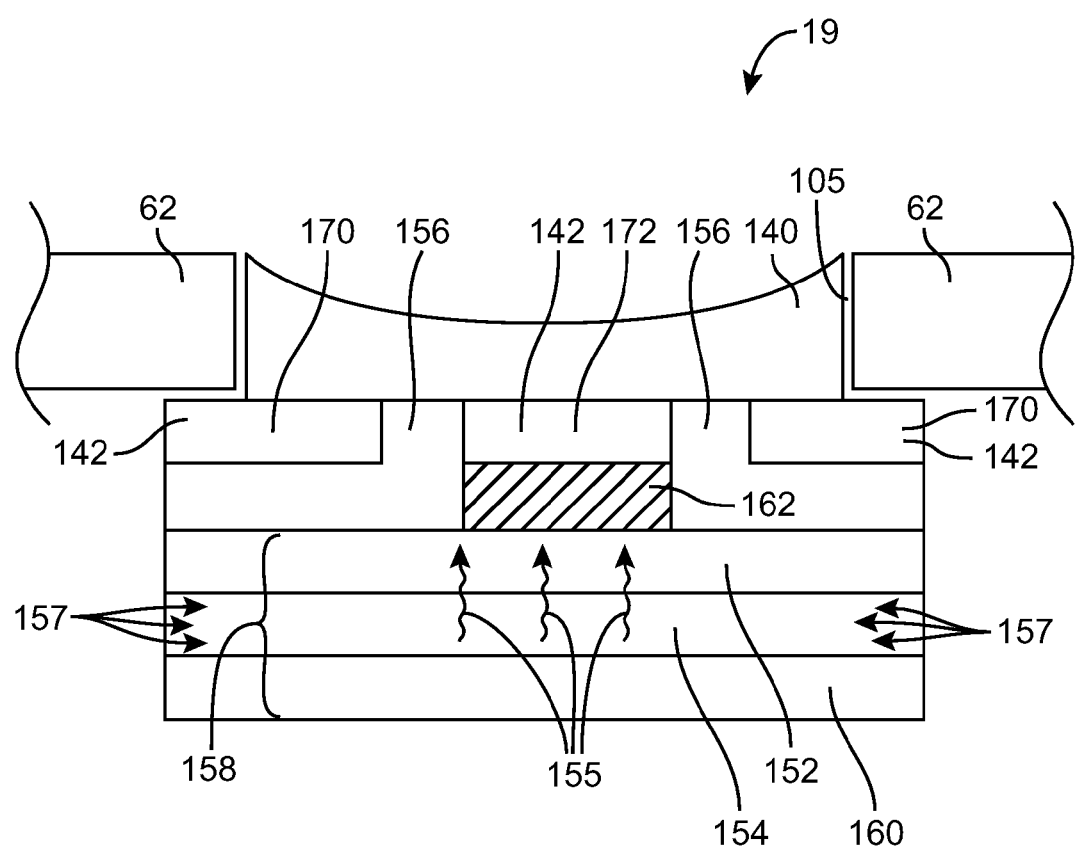
FIG. 17 is a cross-sectional side view of a menu button moisture infiltration indication system showing how a moisture indication structure can be attached to a button using a central region of adhesive in accordance with an embodiment of the present invention.

FIG. 17 is a cross-sectional side view of another menu button moisture indication structure. In this structure, moisture indication structure 146 is adhered only to inner portion 172 of button layer 142 by disk-shaped adhesive layer 162. Adhesive layer 162 need not be transparent in this case as it is not viewable through opening 156.

Figure 18:
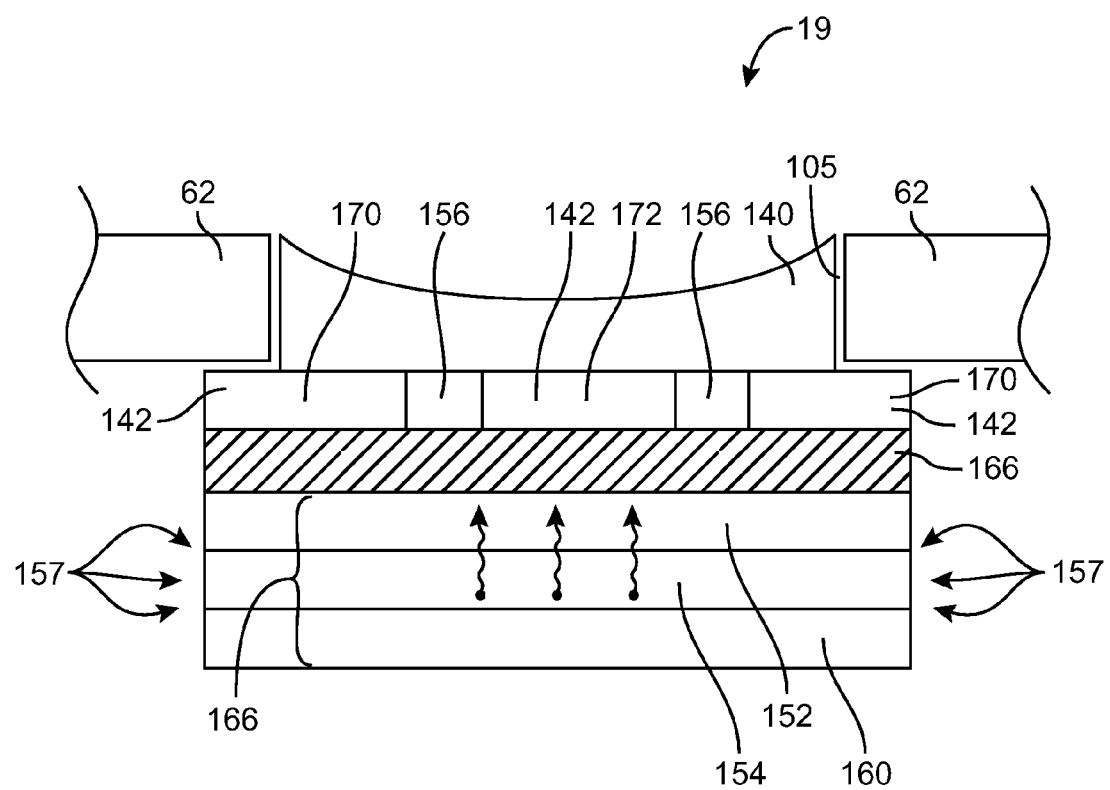
FIG. 18 is a cross-sectional side view of a menu button moisture infiltration indication system showing how adhesive may be applied over the entire lower surface of the button in accordance with an embodiment of the present invention.

FIG. 18 is a cross-sectional side view of another menu button moisture indication structure in accordance with an embodiment of the present invention. In this embodiment, moisture indication structure 166 is adhered to both inner portion 172 and outer portion 170 of button layer 142 by an adhesive layer such as adhesive layer 168 that covers the entire top face of wicking layer 152. Adhesive layer 168 may be a transparent adhesive.

The foregoing is merely illustrative of the principles of this invention and various modifications can be made by those skilled in the art without departing from the scope and spirit of the invention.

What is claimed is:

1. A portable electronic device comprising:
   a housing having a dock connector comprising a viewing hole inside the dock connector; and
   a moisture indication structure attached to the dock connector and viewable through the viewing hole inside the dock connector.

2. The portable electronic device defined in claim 1 wherein the moisture indication structure comprises:
   a wicking layer that covers the viewing hole; and
   a dyeing layer adjacent to the wicking layer.

3. The portable electronic device defined in claim 1 wherein the moisture indication structure comprises a transparent moisture barrier layer attached to the dock connector and covering the viewing hole.

4. The portable electronic device defined in claim 3 wherein the moisture indication structure further comprises:
   an additional moisture barrier layer adjacent to the dyeing layer;
   a wicking layer; and
   a dyeing layer, wherein the wicking layer and the dyeing layer are interposed between the transparent moisture barrier layer and the additional moisture barrier layer.

5. The portable electronic device defined in claim 4 wherein the moisture indication structure further comprises an adhesive layer that attaches the moisture indication structure to the dock connector.

6. The portable electronic device defined in claim 1 wherein the dock connector comprises alignment posts and wherein the moisture indication structure comprises alignment holes for receiving the alignment posts.

7. The portable electronic device defined in claim 1 wherein the moisture indication structure comprises:
   a first moisture barrier layer, the first moisture barrier layer being transparent;
   a wicking layer adjacent to the first moisture barrier layer;
   a dyeing layer adjacent to the wicking layer; and
   a second moisture barrier layer adjacent to the dyeing layer and operable to inhibit moisture from an interior region of the portable electronic device from reaching the dyeing layer, wherein the wicking layer is viewable through the first moisture barrier layer and has a first appearance before exposure to moisture and a second appearance when dyed with dye from the dyeing layer after exposure to moisture, wherein the dyeing layer has a surface in contact with the second moisture barrier layer.

8. The portable electronic device defined in claim 7 wherein the first moisture barrier layer covers the viewing hole.

9. The portable electronic device defined in claim 8 wherein the dock connector comprises a metal frame in which the viewing hole is formed and a plurality of pins.

10. A button in an electronic device, the button comprising:
    a button structure having opposing interior and exterior surfaces and operable to receive user input at the exterior surface; and
    a moisture indication structure attached to the interior surface of the button structure, wherein the button structure comprises a transparent member through which the moisture indication structure is viewed, wherein the moisture indication structure comprises an opaque member with an inner portion and an outer portion that surrounds the inner portion, wherein the inner and outer portions of the opaque member define a ring-shaped viewing aperture, and wherein the inner portion of the opaque member is connected to the moisture indication structure with an opaque adhesive layer.

11. The button defined in claim 10 wherein the moisture indication structure comprises a wicking layer and a dyeing layer adjacent to the wicking layer and wherein the wicking layer is viewable through the transparent member.

12. The button defined in claim 11 wherein the moisture indication structure further comprises a moisture barrier layer adjacent to the dyeing layer.

13. The button defined in claim 12 wherein the opaque member is connected between the transparent member and the moisture indication structure so that the moisture indication structure is viewable through the viewing aperture.

14. The button defined in claim 13, wherein the opaque adhesive layer is in direct contact with the inner portion of the opaque member and is not in direct contact with the outer portion of the opaque member.

15. The button defined in claim 13, wherein the inner portion of the opaque member overlaps the opaque adhesive layer, and wherein the outer portion of the opaque member does not overlap the opaque adhesive layer.

16. A portable electronic device comprising:
   a housing having a port comprising a viewing hole inside the port; and
   a moisture indication structure attached to the port and viewable through the viewing hole inside the port.

17. The portable electronic device defined in claim 16, wherein the port comprises an input-output port.

18. The portable electronic device defined in claim 16, wherein the port comprises a 30-pin data port connector.

19. The portable electronic device defined in claim 16, wherein the port is configured to receive a mating plug.

\* \* \* \* \*